Nov. 21, 1972  B. A. DI LIDDO  3,703,539
PREPARATION OF ESTERS OF UNSATURATED MONOCARBOXYLIC ACIDS
Original Filed March 31, 1967  3 Sheets-Sheet 1

INVENTOR.
BART A. DiLIDDO
BY Robert W. Wilson
ATTY.

INVENTOR.
BART A. DiLiddo

United States Patent Office 3,703,539
Patented Nov. 21, 1972

3,703,539
PREPARATION OF ESTERS OF UNSATURATED
MONOCARBOXYLIC ACIDS
Bart A. Di Liddo, Seven Hills, Ohio, assignor to The
B. F. Goodrich Company, New York, N.Y.
Continuation of abandoned application Ser. No. 627,476,
Mar. 31, 1967. This application Apr. 7, 1971, Ser. No.
132,154
Int. Cl. C07c 69/54
U.S. Cl. 260—486 R                 8 Claims

ABSTRACT OF THE DISCLOSURE

A process is disclosed for preparing simple, polymerizable esters of unsaturated monocarboxylic acids by effecting release of the desired ester by means of a vacuum distillation-disproportionation of the desired ester from a complex sulfate mixture containing the novel monosulfate and disulfate ester-salts of the desired ester. The sulfate mixture is prepared by reaction under essentially anhydrous conditions of an alpha-monoolefin containing up to five carbon atoms with an unsaturated monocarboxylic acid containing up to four carbon atoms in the presence of an excess of anhydrous sulfuric acid. Ethyl acrylate may thus be prepared from ethylene, glacial acrylic acid and concentrated sulfuric acid.

RELATED APPLICATION

The present application is a continuation of my earlier-filed copending application, Ser. No. 627,476, filed Mar. 31, 1967, now abandoned.

BACKGROUND OF INVENTION

The present invention relates to a novel process for preparing simple polymerizable esters of unsaturated monocarboxylic acids. More particularly, this invention relates to a process for the direct preparation of such esters of unsaturated monocarboxylic acids from freely available alpha-monoolefins, sulfuric acid and unsaturated carboxylic acids or equivalent without the formation of an alcohol per se or an alcoholic intermediate and without a classic esterification or trans-esterification step as such. The invention also relates to novel mono and disulfate salts or such esters.

Esters of unsaturated monocarboxylic acids, and particularly the highly reactive or polymerizable esters of the alpha-beta unsaturated monocarboxylic acids, such as those of acrylic acid and methacrylic acid, have usually been produced by first preparing the carboxylic acid, its anhydride or its corresponding acid-amide forms and then esterifying the acid, anhydride or acid amide forms with the desired alcohol, or by trans-esterifying the carboxylic acid or its anhydride with the appropriate ester. The separate preparation of the alcohol and acid or ester esterification agents is expensive and the classic type of esterification and trans-esterification reactions also are expensive to carry out.

SUMMARY OF THE INVENTION

I have discovered that the highly reactive or polymerizable simple alkyl esters of alpha-beta unsaturated monocarboxylic acids such as ethyl acrylate can be released directly from a substantially anhydrous sulfate mixture containing, as the main source of the ester released, novel monosulfate and disulfate salts of the desired carboxylic acid ester by disproportionating and distilling such complex mixture of sulfate-ester salts under vacuum at temperatures not higher than about 100° C. at the still head (to minimize thermal polymerization of the ester product and of the unsaturated acid and to avoid carry-over of the carboxylic acid content in the mixture) and not higher than about 170° C. in the still pot (to minimize corrosion and decomposition). Distillation and disproportionation carried out in this manner under a vacuum of at least about 200 mg. Hg absolute pressure at the still head with the pressure and temperature balanced so as to avoid vaporization of the corresponding acid effects an efficient release of the more volatile ester from its sulfate ester-salt forms without liberation of water, carbon oxides or other decomposition products, without undue decomposition and loss of the sulfuric acid and the sulfate salt content of the mixture, and without the formation of significant amounts of by-products. The method permits anhydrous recycle of the sulfuric acid and sulfate moieties of the still bottoms product without expensive recovery, purification and/or re-concentration steps.

The esters with which this invention deals are the simple, polymerizable alkyl esters of an unsaturated, monocarboxylic acid, in which the acid moiety is derived from an alpha-beta unsaturated monocarboxylic acid containing up to 4 carbon atoms and in which the alcohol moiety is derived from an aliphatic monohydric alcohol containing from 2 to 5 carbon atoms. Thus, the esters produced in this invention are those of acrylic acid, methacrylic acid, and vinylacetic acid (3-butenoic acid). The alcohol moiety of these esters is derived from the corresponding olefin precursor and thus can be considered as having been derived from ethanol, the propanols, the butenols, and the pentanols.

The alpha-beta monocarboxylic acid should be, as is indicated herein, added to the system in as concentrated form as possible, preferably in the glacial form or in the form of its anhydride. Acrylic acid also can be employed in the form of its anhydride and the low polymers or polyesters of the latter such as for example, beta-propiolactone and polymers of beta-propiolactone where $n$ is an integer with some advantage as shown in very high conversions and high fluidity of the depleted sulfate solutions. It is necessary therefore, to utilize acids containing less than about 4% wt. of water, although non-aqueous contaminants or diluents can be higher, for example, acetate ester such as ethyl acetate or saturated hydrocarbons such as hexane, etc. can be present as diluents to the extent of as high as 60% in acrylic acid since the diluents in such case are recovered nearly quantitatively in the process.

The sulfate ester-salts forms of the desired ester can be prepared in several ways. One such method comprises several steps, namely, the direct fixation of the desired alpha-monoolefin on an excess of anhydrous sulfuric acid at superatomspheric pressure and at a temperature of from about 20° C. to about 170° C. and then mixing and equilibriating the resulting complex sulfate mixture with the desired unsaturated carboxylic acid (or its equivalent) whereby the corresponding carboxylic acid ester-sulfates are formed by a complex series of equilibriation-rearrangement type reactions. Another method comprises the direct fixation of the desired alpha-monoolefin in a substantially anhydrous mixture of sulfuric acid and the desired alpha-beta monocarboxylic acid under the conditions described.

A much more preferred procedure involves the fixation of the desired alpha-monoolefin by reaction with a complex recycle mixture obtained as a still bottoms product in the vacuum distillation-disproportionation step, such mixture containing in addition to unreacted sulfuric acid and unreacted carboxylic acid, a spectrum of compounds including residual alkyl mono and disulfates, residual monosulfate and disulfate salts of the carboxylic acid per se, residual or unreleased monosulfate and disulfate salts of the ester form of the carboxylic acid, the dimers and mixed dimers of the unsaturated carboxylic acid and of its ester, and many others. The vacuum distillation or vacuum disproportionation, as described, of the resulting enriched fixation mixture produces the desired ester in a smooth and controlled manner. The use of the recycle mixture effects considerable savings in sulfuric acid by eliminating separate recovery, concentration and separate recycle of the latter, and reduces losses of alpha-monoolefin and carboxylic acid while resulting in very high yields (i.e. over 85%) of the desired ester.

Surprisingly, neither the unsaturated carboxylic acid nor the alpha-monoolefin are polymerized or decomposed to any significant degree by interaction with concentrated sulfuric acid and/or its sulfate type of reaction products under substantially anhydrous conditions. Sulfuric acid appears to function in such reactions as an intermediate which is regenerated and not as a catalyst to any large degree. Analytical evidence exists to the effect that both the fixation of the alpha-monoolefin and the interaction of the unsaturated carboxylic acid with the concentrated sulfuric acid and/or with its salt-type reaction products, proceeds through the opening of the terminal double bonds. This has been followed by analyses for total unsaturation of the mixture. When the unsaturated acid or the olefin is added to anhydrous sulfuric acid or its sulfate reaction products, unsaturation rapidly disappears. The unsaturation in the carboxylic acid moiety is nevertheless rather completely regenerated upon release of the ester during the vacuum distillation step. Likewise, the sulfuric acid, except for losses due to unavoidable decomposition to $SO_2$ under vacuum, is also regenerated and, unlike other methods, in the process of this invention is recovered in a substantially anhydrous and directly reusable, although more or less combined form. Used in such a manner, sulfuric acid functions as a highly effective inhibitor of vinyl-type polymerization.

While the chemistry of the many and complex reactions which occur during the process of this invention is not fully understood, analytical evidence exists indicating that the following reactions do occur:

(1) $HOSO_2OH + CH_2=CH_2R \rightleftharpoons HOSO_2OCH_2CH_2R$ (2) $2HOSO_2OCH_2CH_2R \rightleftharpoons$
$\quad SO_2(OCH_2CH_2R)_2 + HOSO_2OH$ (3) $R'COOH + HOSO_2OH \rightleftharpoons HOSO_2OR'COOH$ (4) $2HOSO_2OR'COOH \rightleftharpoons SO_2$
$\quad (R'COOCH_2CH_2R)_2 + HOSO_2OH$ (5) $R'COOH + HOSO_2OCH_2CH_2R \rightleftharpoons$
$\quad HOSO_2OR'COOCH_2CH_2R$ (6) $SO_2(OCH_2CH_2R)_2 + R'COOH \rightleftharpoons$
$\quad HOSO_2OCH_2CH_2R + R'COOCH_2CH_2R\uparrow$ (7) $HOSO_2OR'COOCH_2CH_2R \rightleftharpoons$
$\quad HOSO_2OH + R'COOCH_2CH_2R\uparrow$ (8) $SO_2(R'COOCH_2CH_2R)_2 \rightleftharpoons$
$\quad HOSO_2OH + 2R'COOCH_2CH_2R\uparrow$ wherein R is a substituent group selected from hydrogen and alkyl hydrocarbon groups containing up to 3 carbon atoms and R' is a substituent hydrocarbon group selected from the class consisting of (a) terminally-unsaturated alkenyl hydrocarbon groups containing up to 3 carbon atoms and having its unsaturation present in the structure $CH_2 + C<$ and (b) groups remaining after sulfation of said alkenyl hydrocarbon groups (a) (the designation R' is retained in the sulfate form compounds for identification, even though there is no observable unsaturation in such compounds).

Reactions (7) and (8) show the structural formulae of the novel monosulfate and disulfate ester-salts of this invention. As will be seen, these compounds have the general formula $$X-O-SO_2-O-R'COOCH_2CH_2R$$

wherein X is a substituent group of the class consisting of hydrogen and the group $(R'COOCH_2CH_2R)$ and R and R' have the structure as defined above.

Reactions (6), (7) and (8) are believed to account for most of the yield of ester obtained in the process of this invention, with reaction (7) believed to account for the largest yield of ester in certain of the more preferred manners of carrying out the invention as shown in the description to follow.

DESCRIPTION OF PREFERRED EMBODIMENTS

Figure 1:
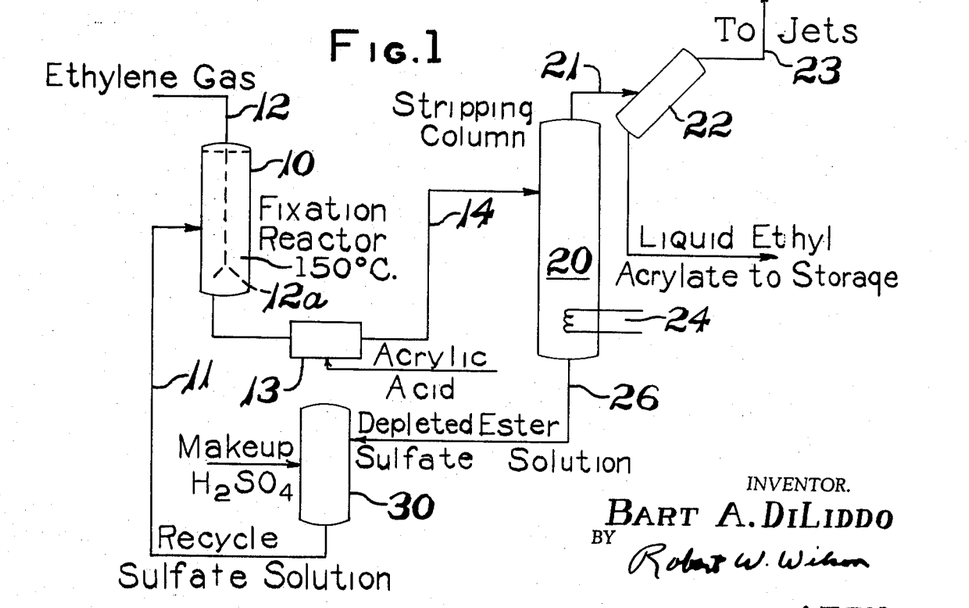
FIG. 1 is a simplified schematic flow sheet of an embodiment of the process of this invention exemplifying the preparation of ethyl acrylate from ethylene and anhydrous acrylic acid in the presence of substantially anhydrous sulfuric acid in an essentially two-step process which can be carried out either in a cyclic batchwise manner or in a continuous manner.

In FIG. 1, a high pressure reactor 10 fitted with baffles, water-jacket, cooling coils and an agitator (not shown in FIG. 1) is supplied with an anhydrous recycle sulfate stream through line 11 and essentially anhydrous ethylene gas through line 12 and dip tube 12a. There is thus maintained in reactor 10 a total sulfate (sulfuric acid both free and combined) concentration of between about 20 and about 80%/wt. as determined by an ignition type analytical procedure. Under the latter conditions, the free sulfuric acid content of the mixture, as determined by a lead nitrate titration method, can be from about 5%/wt. to about 60%/wt.

The pressure in the fixation reactor 10 is adjusted and kept relatively constant at a superatmospheric pressure between about 100 to 1500 lbs./sq. in. or higher by varying the rate of addition of ethylene gas through line 12 and is preferably maintained between about 250 and about 800 lbs./sq. in. The pressure in reactor 10 is not critical but as the pressure increases, the rate at which ethylene will react generally will increase.

Heat is supplied to reactor 10 to start the reaction through a heating jacket and/or internal heating and cooling coils (not shown) so as to maintain the reactants at a temperature from about 100° C. to no higher than about 170° C., most preferably from about 125 to about 160° C. After the reaction is going the exothermic nature of the reaction will require cooling to be applied through the coils and/or a cooling jacket.

Below about 100° C. the rate of the fixation reaction is very low while above about 170° C. the solubility of the olefin in the mixture is very low, the corrosion of even special acid-resisting materials of construction is very severe and the amount of sulfuric acid lost by decomposition to $SO_2$ will be economically undesirable. The range of 125° to 160° C. is a compromise between reaction rate and minimized corrosion and decomposition.

Meanwhile the liquid contents of reactor 10 are subjected to intense shearing type of agitation to disperse the ethylene gas which is introduced near the agitator at the bottom of the reactor. On initial start-up, reactor 10 is charged with concentrated sulfuric acid (i.e. not less than 96%/wt. strength, and preferably 98 to 100%/wt. strength). Addition of ethylene is then commenced under the conditions indicated. When the rate of ethylene take-up begins to slow down, pumping of the reaction mixture to the second step is commenced, but more about this below.

Under steady-state operation, when recycled sulfate solution is present in reactor 10 the fixation reaction mixture will contain all of the reaction products indicated in reactions (1) through (8) above and in addition there undoubtedly are many other products of reactions occurring such as thermally-induced dimers of the acrylic acid and of ethyl acrylate and the conjoint dimers of acrylic acid and ethyl acrylate among others. A typical analysis of the effluent from a fixation reactor is given in the examples below, showing that the mixture contains unreacted sulfuric acid and acrylic acid as well as the many and varied products of the reactions occurring in fixation reactor 10.

Figure 3:
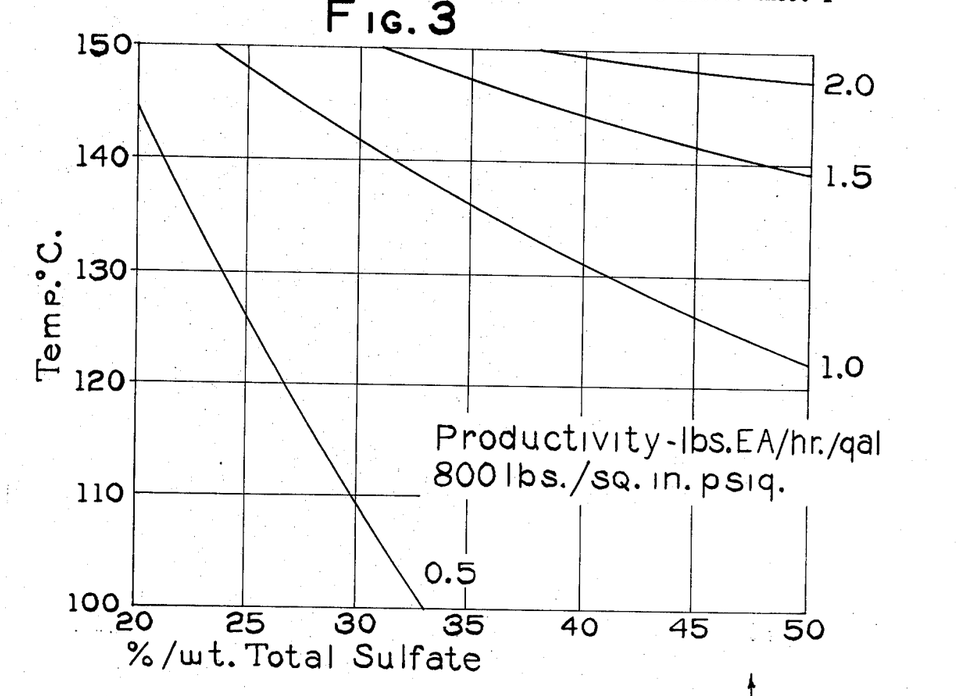
FIG. 3 is a graph showing, as ordinates on the right hand margin, productivity (expressed as pounds of ester produced per hour per gallon of reactor volume) and also as ordinates on the left hand margin, the temperature in ° C. during the fixation reaction, both plotted against as abscissae, percent/wt. of total sulfate in the fixation reactor in a process such as is represented in FIGS. 1 and 2, the several curves representing various sets of operating condition at which effective rates of ethylene fixation are obtained at a pressure of about 800 p.s.i.g.

An alpha-monoolefin such as ethylene can be fixed by reaction with mixtures varying quite widely in sulfuric acid concentration. Fixation is quite rapid in essentially undiluted, concentrated sulfuric acid, however, corrosion of metal equipment, even of acid-resisting alloys such as stainless steel, Monel and Hastelloy, at this concentration and at temperatures of from 100 to 170° C. is very severe. Good fixation rates are maintained and corrosion is reduced to practical levels by diluting the sulfuric acid under essentially anhydrous conditions with a recycled, substantially anhydrous sulfate solution obtained in the subsequent stripping/disproportionation step producing an effective total (i.e. unreacted and combined) sulfate concentration from about 20%/wt. to about 80%/wt. and preferably between about 30% and 60% wt. When the sulfate concentration is diluted below about 20%/wt. the rate of fixation falls to very low and uneconomic levels. The effects of total sulfate concentration and temperature during the fixation reaction are plotted in FIG. 3 of the drawings, the various curves of FIG. 3 representing several sets of conditions obtaining during fixation of ethylene at a reactor pressure of about 800 p.s.i.g.

The total acrylic acid concentration (both free and combined) in the reaction mixture in the fixation reactor can vary quite widely from 0%/wt. to 80%/wt. More preferred is a level of total acrylic acid from 45%/wt. to 65%/wt. It is to be understood that the level of acrylic acid should not be allowed to build up during a continuous reaction but rather should be controlled within the above limits by adding make-up acrylic acid at about the same rate, on a molar equivalent basis, at which acrylate ester is removed in the subsequent distillation step.

The process of this invention is best operated by forcing as much ethylene as possible to react in the fixation step although there is some indication that at very high levels of alkyl hydrogen sulfate liberation of $SO_2$ is higher sometimes accompanied also by higher ether formation. Such higher rate of ethylene fixation is desirable when operating in a continuous manner, since the uptake of ethylene in the fixation reactor is a limiting factor on the rate of release of ethyl acrylate in the subsequent vacuum distillation step. More importantly, however, it has been found that the greater the uptake of ethylene in the fixation step with respect to the release of ethyl acrylate in the vacuum distillation step, the more fluid will be the spent sulfate solution which collects in the bottom of the vacuum distillation column. The reasons for this greater fluidity are not fully understood but the greater fluidity may be caused by the alkyl sulfates and/or ethyl acrylate sulfates being more fluid in nature than, for example, the sulfates of acrylic acid. The increased concentration of fixed ethylene may also result in greater suppression of the dimerization or vinyl-type polymerization in the vacuum still pot since at higher ethylene uptake ratios the acrylic acid is more likely to be present as ethyl acrylate sulfates.

In any event, it is most desirable to operate the fixation reactor so as to bring about the fixation of from about 0.75 to about 1.5 moles of ethylene per mole of total sulfate in the reactor. To this mixture there is most desirably added about 0.75 to about one mole of glacial acrylic acid for every mole of ethyl acrylate being stripped off as crude product in the vacuum distillation step. This mode of operation insures that the total acrylate content of the recycle stream stays at a minimal value and exerts a minimum retarding action on the uptake of ethylene in the fixation reactor.

The above discussion of sulfuric acid concentration or dilution in the fixation reaction mixture should not be confused with the degree of concentration or strength of the sulfuric acid and acrylic acid ingredients which are to be added to the system. The presence of water in any of the reactants is undesirable in many ways. Water enters into the reaction forming by-products which lead to losses of the 1-olefin reactant in the following and other ways:

(9) $H_2O + RCH_2CH_2OSO_3H \rightleftharpoons RCH_2CH_2OH + H_2SO_4$ (10) $H_2O + (RCH_2CH_2O)_2SO_2 \rightleftharpoons (RCH_2CH_2)_2O + H_2SO_4$ (11) $2H_2O + (RCH_2CH_2O)_2SO_2 \rightleftharpoons 2RCH_2CH_2OH + H_2SO_4$ (12) $H_2O + R'COOCH_2CH_2R \rightleftharpoons R'COOH + RCH_2CH_2OH$ (13) $RCH_2CH_2OH + RCH_2CH_2OSO_3H \rightleftharpoons RCH_2CH_2OCH_2CH_2R + H_2SO_4$ (14) $RCH_2CH_2OH + (RCH_2CH_2O)_2SO_2 \rightleftharpoons RCH_2CH_2OCH_2CH_2R + RCH_2CH_2OSO_3H$ The appearance of alcohols and ethers in the product is taken as strong evidence that water has entered the system. In addition, since many unreacted oxygen-containing substances appear to retard the rate of fixation and lead to by-product formation, it is essential that the sulfuric acid, the unsaturated monocarboxylic acid and 1-olefin ingredients be dry or essentially dry when added to the system. For this reason, the sulfuric acid and carboxylic acid ingredients should on addition to the system be highly concentrated, i.e. have a concentration of at least 96%/wt. or more. On the other hand, the use of fuming sulfuric acid results in losses through decomposition of the organic raw materials and/or product present in the mixtures.

If the unsaturated monocarboxylic acid is to be added directly to the sulfuric acid and/or sulfate solutions, this should be carried out with efficient mixing to disperse the organic acid and secure chemical interaction or equilibriation with the sulfuric acid and/or sulfates before polymerization occurs. While, as is pointed out below low polymers and low polyesters of the unsaturated monocarboxylic acid can be employed as a source of this acid, uncontrolled polymerization of the acid can lead to deposition of solids with reduction in heat transfer and/or plugging of lines, valves, etc.

The complextion reaction mixture produced in fixation reactor 10 is pumped to a surge tank 13 through line 14 where essentially anhydrous acrylic acid is added. It is believed that addition of the acrylic acid to an intermediate surge tank may minimize $SO_2$ liberation in the subsequent disproportionation step. From surge tank 13 the resulting mixture flows through line 14 to a vacuum distillation column or tower 20, referred to herein as the stripping/disproportionation tower, and containing packing or sieve-type or bubble-cap type trays. A vacuum is drawn on tower 20 through line 21, condenser 22 and line 23, with the coolant supplied to condenser 22 being sufficiently low in temperature to assist in maintaining in tower 20 an absolute pressure less than about 200 mm. Hg and preferably between about 20 and about 150 mm. Hg.

The reaction mixture reaches the stillpot where heat is supplied by means of heating coil 24 or other means to maintain the liquid contents at a temperature not higher than about 170° C. and preferably in the range of from about 120° C. to about 160° C. The still head pressure in tower 20 should be at the point where ethyl acrylate will distill over. The vapor pressure of ethyl acrylate at 80° F. (Ca. 26.6+° C.) is about 40 mm. Hg. Thus, still head temperatures of at least about 0° C. to as much as 60° C. are sufficient, on the one hand, to minimize contamination with acrylic acid, and on the other to insure efficient removal of ester at practical pressures.

Under these conditions, vapors of ethyl acrylate percolate up through the column and supply heat to the downcoming liquid thereby releasing further quantities of ethyl acrylate. The vapors of ethyl acrylate pass out of the top of tower 20 through line 21 and enter condenser 22 which in this case can be water-cooled. The vapors condense in condenser 22 and the resulting liquid ethyl acrylate condensate is found to be of very high purity (i.e. above about 90%/wt. purity). The liquid ethyl acrylate flows from condenser 22 through line 25 to storage or to subsequent conventional treatment steps such as stabilization (addition of a polymerization inhibitor), water washing (to insure removal of traces of $SO_2$ which may have dissolved therein) and/or flash distillation or fractionation. However, as will be shown elsewhere herein, subsequent extensive purification of the ethyl acrylate product is not necessary for many uses since this product leaves condenser 22 with sufficient purity as to be readily polymerizable at good rates.

Also, volatiles such as traces of ethylene, water vapor, $SO_2$ and other decomposition products are vented from condenser 22 to the atmosphere, usually through some means, not shown, to scrub out the obnoxious $SO_2$ vapors.

The depleted sulfate solution is removed from the stillpot of tower 20 through line 26 to a hold-up/make-up or surge vessel 30 where a sufficient heel is maintained to insure uniform rate of recycle to reactor 10 through line 11. In vessel 30, make-up concentrated sulfuric acid is added (as determined by analysis) to replace the amount of sulfuric acid lost from the system as $SO_2$ from tower 20. The total sulfate concentration in surge vessel 20 should preferably be from about 30%/wt. to about 60%/wt.

The process described operates at high efficiencies based on the amount of the acrylic acid charged. When operating as described, the average yield of ethyl acrylate will be above 90%, frequently being in the range of 95 to 98%. Ethylene efficiencies are lower since unreacted ethylene can be carried over to tower 20 where it will be lost to the atmosphere through condenser 22. Nevertheless, ethylene efficiencies in the range of 60 to 75% per pass are achieved. The productivity of this process also is quite good since productivities of up to three pounds or more per hour of ethyl acrylate per gallon of reactor volume are achieved.

Figure 2A:
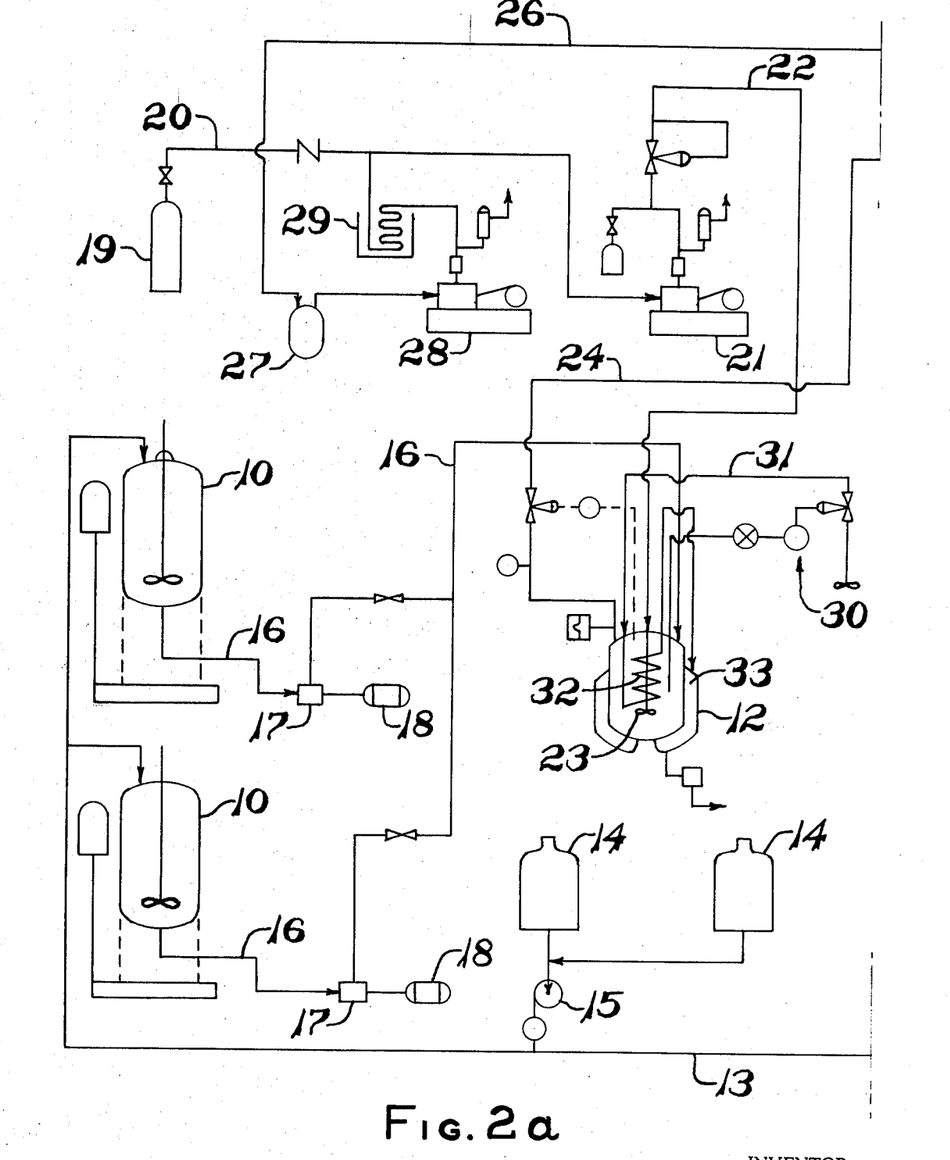
FIG. 2 is a more complete process flow sheet of another preferred embodiment of the invention, this figure showing a process similar to that of FIG. 1 but employing the addition of make-up acrylic acid to a recycle sulfates urge tank, recovery and recycle of unreacted ethylene, and rectification of the ethyl acrylate product.
Figure 2B:
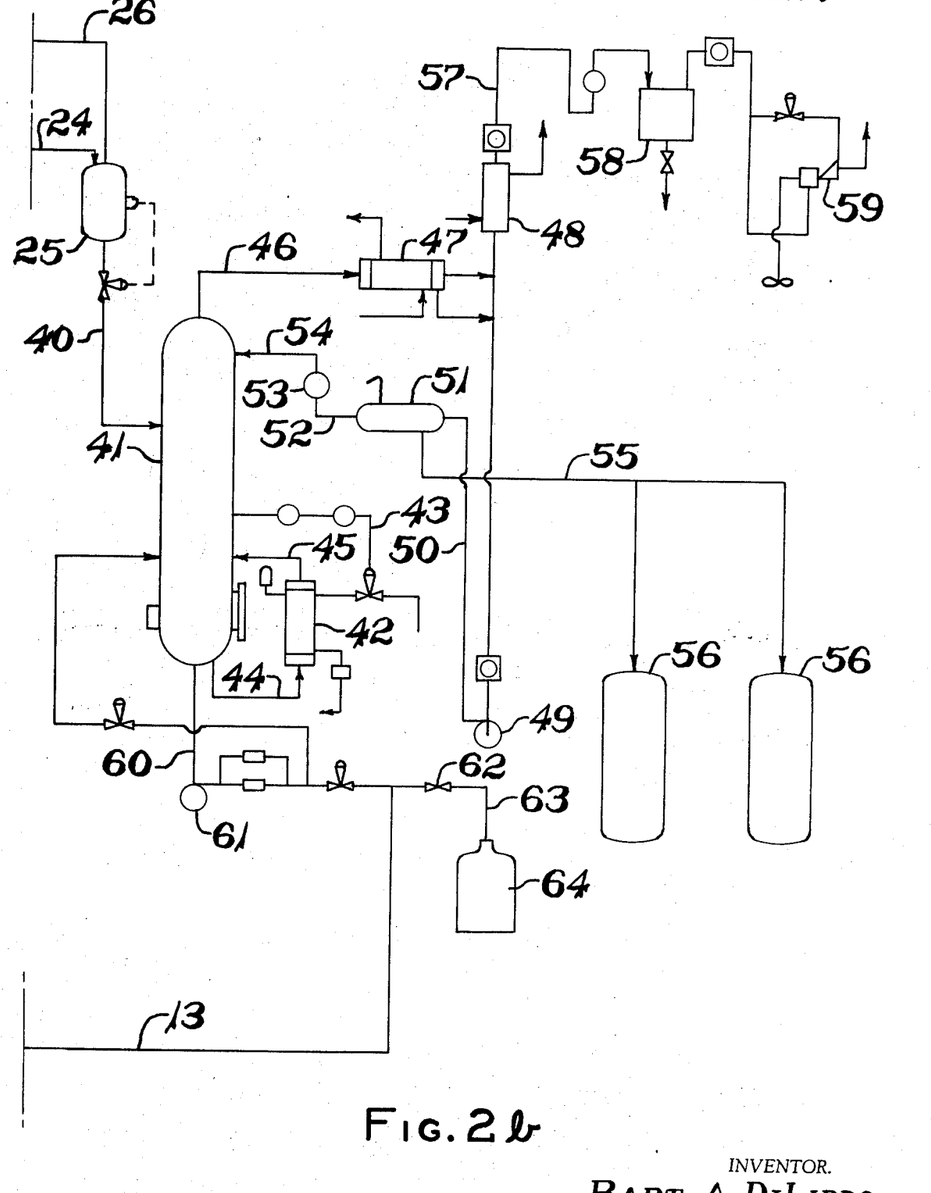

A more complete ambodiment of the process of this invention is schematically represented in FIG. 2 of the drawings wherein two reactor feed weigh tanks 10 are arranged to work on an alternate on-off basis feeding a fixation reactor 12. Tanks 10 are supplied with recycle sulfate solution through line 13. Make-up acrylic acid is added to tanks 10 from supply tanks 14 which also are arranged to be operated in on-off fashion. The acrylic acid make-up is added to line 13 by means of a pump 15.

The thus combined materials are stored in the feed tanks 10 under mild agitation and at a residual-heat temperature to allow thorough intermingling and some time for equilibriation to occur between the added acrylic acid and the sulfate content of the recycle sulfate solution.

During operation, the replenished feed solution is pumped from one of tanks 10 through a line 16 and pump 17 to reactor 12 where the material enters reactor 12 preferably near the top and to one side thereof. Make-up sulfuric acid from a storage vessel 18 is added to the liquid in line 16 by in-line mixing in pump 17 thereby to adjust the total sulfate concentration of the replenished sulfate solution and produce a properly balanced feed solution containing from about 30%/wt. to about 60%/wt. total sulfate.

When the process is started up, the liquid reaction medium in reactor 12 is heated to a temperature below about 170° C., preferably from about 125° C. to about 160° C. by means of steam supplied by a regulator-controller system 30 from which, for example, 150 p.s.i.g. steam flows through line 31 to an internal heating coil 32 and from thence to an external heating jacket 33 surrounding reactor 12.

Ethylene vapor under storage pressure flows from a storage tank 19 through line 20 to a main ethylene feed compressor 21 and from thence through line 22 to reactor 12 where it flows axially down the center of the agitator shaft and exits near the bottom of the reactor in the near vicinity of the agitator blades 23. The rate of ethylene feed is regulated so as to maintain an essentially constant ethylene pressure in reactor 12 between about 100 and 1500 p.s.i.g., preferably between about 500 and about 1000 p.s.i.g. The rapid rotation of the blades 23 efficiently disperse the ethylene vapor in the liquid reaction mixture insuring a maximized absorption of ethylene.

Unfixed ethylene may be carried by the liquid reaction mixture which flows from reactor 12 through line 24 to liquid/vapor separator 25. The unreacted ethylene is released and carried overhead from separator 25 through line 26 through an $SO_2$ stripper 27 to a recycle gas compressor 28 and from thence to a gas cooler coil 29. Cooled, re-compressed recycle ethylene is then fed into line 20 for recycle through the main ethylene supply compressor 21 for recycle to reactor 12.

Reactor 12 is normally operated in an essentially completely filled condition with only a small ethylene vapor space in the domed area of the reactor so that the entering feed displaces an equal volume of reaction mixture through line 24 to separator 25. Since the feed inlet of line 16 and exit line 24 are located on opposite sides of the reactor 12, the down-pumping action of the agitator blades 23 is quite effective in preventing short-circuiting of fresh liquid feed. Other types of reactor design could be employed, if desired.

Thus, there is provided appreciable residence time in reactor 12 for the ethylene to react with sulfuric acid forming alkyl sulfates and with sulfuric acid and/or acrylic acid forming ethyl acrylate sulfates.

After ethylene flashing in separator 25, the remainder of the reaction mixture flows through line 40 to a packed distillation column 41 provided with packing or sieve or bubble cap trays. Line 40 enters column 41 some distance down from the top of the column so as to provide a short rectification section above the feed entrance port. The reaction mixture trickles down through column 41 counterflow to ethyl acrylate vapors rising from the still pot. Material reaching the bottom of column 41 is heated by means of an external steam heating coil 42 controlled by a regulator system 43. Reaction mixture is withdrawn from the bottom of tower 41 through line 44 passed through heating coil 42 and through line 45 back into the tower. The reaction material in the lower end of column 41 is thus maintained at a temperature below about 170° C., preferably from about 120 to about 160° C., causing the liberation of ethyl acrylate vapors. The ethyl acrylate vapors percolate up tower 41 and are rectified to a certain extent by the descending cooler feed to reduce their content of acrylic acid..

The ethyl acrylate vapors and non-condensibles leave the top of tower 41 through line 46 and pass from thence through a primary condenser 47 where most of the ethyl acrylate condenses and thence to a vent condenser 48 where the last traces of ethyl acrylate are condensed. Liquid, crude ethyl acrylate flows from condensers 47, 48 to a pump 49 and from thence through line 50 to small surge vessel 51. A portion of the liquid ethyl acrylate can be withdrawn from surge vessel 51 through a line 52 and valve 53 and introduced to the top of tower 41 through line 54 to supply liquid ethyl acrylate reflux introduced above the feed inlet port for line 40. When the latter is carried out, additional rectification of the ethyl acrylate vapors produces a very significant reduction in the acrylic acid content of the crude ethyl acrylate, as will be seen in Table II of the examples (cols. 9 and 10).

The remainder of the crude ethyl acrylate flows from the surge vessel 51 through line 55 to one of a pair of crude ethyl acrylate storage vessels 56.

Non-condensibles leave vent condenser 48 through line 57 and pass through a trap 58 and a vacuum jet 59 which evacuates the non-condensibles and reduces the pressure in the column 41. The pressure in column 41 is desirably below about 200 mm. Hg.

The spent sulfate solution which accumulates in the bottom of tower 41 is withdrawn through line 60 and pump 61 which discharges into recycle-return line 13. If desired, a valve 62 in connecting line 63 can be opened to discharge a quantity of the spent sulfate solution into a waste sulfate tank 64 for disposal and/or reworking and/or to dispose of suspended solids which may accumulate in the bottom of tower 41.

The process of FIG. 2 of the drawings is superior to that of FIG. 1 of the drawings in several particulars. One such advantage resides in adding make-up acrylic acid to the feed make-up tanks which allow some equilibration of the acrylic acid with the sulfate moieties so as to make best use of the polymerization-inhibiting effects of the sulfuric acid and its reaction products.

Another great advantage of the process diagrammed in FIG. 2 is the provision of ethylene recovery and recycle facilities. The latter combine with the efficient ethylene dispersion means to very markedly improve ethylene conversion efficiencies. The process of FIG. 2 improves ethylene efficiencies from the 50 to 70% level usual with a FIG. 1 process to about 80 to 90%.

A third advantage of the process of FIG. 2 is the provision of ethyl acrylate rectification capability in the stripper-disproportionator column 41. By this means, the acrylic acid content of the ethyl acrylate product is reduced to very low levels and the purity of the product increased above 95%/wt.

Both the fixation reactor and the stripping/disproportionation tower are preferably operated with inhibitors of polymerization present in contact with the liquid materials and vapor contacting surfaces. The inhibitor can be a material soluble in the liquid medium such as for example copper acetate or other soluble inhibitors such as hydroquinone, phenothiazine, methylene blue and others. Copper compounds are quite effective in minimizing vinyl-type polymerization. Portions of the equipment, particularly those areas of equipment exposed to the vapors of the polymerizable alpha-beta monocarboxylic acid and/or of its esters and of $SO_2$ can be made of copper or it can be copper clad, or it can be made of copper-containing Monel metal. Also, pieces of sacrificial copper metal can be secured in various places in the equipment or tower and condenser packing materials can be made of copper or Monel metal. The stabilizer/inhibitor substance, if soluble in organic materials, can be introduced to the reaction vessels by dissolving it in the carboxylic acid make-up and/or in the recycle sulfate solution.

Example I

In this example ethyl acrylate is synthesized from ethylene and glacial acrylic acid in a cyclic batchwise procedure wherein, in the first cycle, concentrated sulfuric acid (100) and ethylene are reacted at 500 p.s.i.g. and 100°–125° C. and glacial acrylic acid is subsequently added thereto. The mixture resulting from the latter reaction is then vacuum distilled under a vacuum of 10 to 25 mm. Hg with a pot temperature varying between about 90 and about 130° C. and a head temperature varying between about 25 and about 80° C. In subsequent cycles all carried out under substantially similar conditions, the spent sulfate from the preceding cycle is recycled along with make-up amounts of 100% sulfuric acid and glacial acrylic acid. In this series 100% concentrated $H_2SO_4$ and glacial acrylic acid are employed but water is deliberately added to demonstrate its effects on the process. Tabulated below in Table I are material balance data for three successive cycles.

TABLE I

| | Run number | | | Cumulative |
|---|---|---|---|---|
| | 3605 | 3608 | 3614 | |
| Ethylene fixation—materials fed, gms: | | | | |
| $H_2SO_4$ (100%) | 515 | | | |
| Ethylene uptake | 212 | 114 | 113 | 439 |
| Spent sulfates | | 603 | 531 | |
| Total | 727 | 717 | 644 | |
| Stripping column—materials fed, gms: | | | | |
| Glacial acrylic acid | 590 | 216 | 216 | 1,022 |
| Sulfates | 727 | 715 | 644 | 208 |
| $H_2O$ (added as such) | 154 | 27 | 27 | |
| Total | 1,471 | 958 | 887 | |
| Stripping column—materials out, gms: | | | | |
| Ethyl acrylate | 454 | 290.0 | 293.0 | 1,037.0 |
| Acrylic acid | 132 | 48.0 | 53.0 | 232.2 |
| $H_2O$ | 129 | 26.1 | 19.7 | 174.3 |
| Ethanol | 6.8 | 17.0 | 9.9 | 33.7 |
| Ethyl ether | 72.3 | 12.6 | 17.4 | 102.3 |
| Spent sulfates | 622 | 534.0 | 465.0 | |
| Losses | 55 | 30.1 | 29.0 | |
| Total | 1,471 | 958 | 887 | |
| Percent conversion [1] | 77.8 | 77.2 | 75.4 | 77.0 |
| Yield, percent [2] | 69.8 | 124.8 | 129.5 | 94.7 |

[1] Based on acrylic acid charged.
[2] Yield of ethyl acrylate based on acrylic acid charged.

These data show that in each cycle the proportion of acrylic acid converted is essentially constant. The yield of ethyl acrylate is low in the first cycle but is almost 125–130% in the two subsequent cycles for an overall average of about 95% showing that acrylic acid retained in the recycle sulfates from the first cycle is regenerated as ethyl acrylate in subsequent cycles.

Note also that a total of 102.3 grams of ethyl ether and 33.7 grams of ethanol are formed in the three cycles. This represents a significant loss of ethylene due to the addition of water.

Example II

In this example, a series of semi-continuous runs are described starting with raw materials similar to those of Example I but using equipment similar to that shown in FIG. 2. In this example, the initial feed for cycle 1 consisted of 35 parts/wt. of 99% sulfuric acid and 65 parts/wt. of glacial acrylic acid saturated with cupric acetate. The feed for the subsequent cycles consisted of the still bottoms residue (recycle sulfate solution) from the previous cycle plus approximately one mole of acrylic acid added for every mole of ethyl acrylate recovered in the previous cycle. Table II below shows the summary of data for the complete series of 10 cycles.

TABLE II

|  | Cycle | | | | | | | | | |
|---|---|---|---|---|---|---|---|---|---|---|
|  | 1 | 2 | 3 | 4 | 5 | 6 | 7 | 8 | 9 | 10 |
| Temperature, °C.[1] | 150 | 150 | 150 | 150 | 150 | 135 | 135 | 150 | 150 | 150 |
| Time, hrs.-min | 1-0 | 2-10 | 2-10 | 2-30 | 0-30 | 2-30 | 2-30 | 2-30 | 2-30 | 2-30 |
| Pressure, p.s.i.g | 500 | 500 | 800 | 800 | 500 | 500 | 800 | 800 | 800 | 800 |
| Acrylic acid eff./cycle | 82.9 | 94.6 | 101.0 | 109.6 | 125.6 | 93.0 | 93.8 | 98.7 | 93.5 | 142.7 |
| Ethylene eff/cycle | 69 | 95 | 91 | 94 | 59 | 112 | 89.8 | 88.1 | 96.3 | 42.0 |
| EA yield, percent [2] | 94.2 | 94.0 | 97.6 | 93.2 | 96.2 | 99.0 | 96.3 | 96.1 | 96.0 | 97.0 |
| AA conversion/cycle, percent [3] | 47.3 | 54.5 | 58.7 | 63.5 | 22.3 | 31.9 | 37.0 | 48.2 | 53.3 | 23.6 |
| Percent wt. EA in product | 90.4 | 89.6 | 91.6 | 87.4 | 81.9 | 89.9 | 85.8 | 96.1 | 96.2 | 97.0 |
| Percent wt. AA in product | 7.4 | 5.0 | 5.2 | 6.2 | 14.8 | 9.2 | 10.9 | 0.1 | 0.0 | 0.0 |
| Percent BP [4] in product | 2.2 | 5.4 | 3.1 | 6.3 | 3.3 | 0.9 | 3.3 | 3.8 | 3.8 | 3.0 |
| Total wt. eff./cycle | [5]78 | [5]94. | [5]97 | [5]104 | [5]116 | [5]97 | [6]92.5 | [6]95.4 | [6]94.4 | [6]85.5 |

[1] Fixation reactor.
[2] Ethyl acrylate.
[3] (AA) means acrylic acid.
[4] Percent wt. by-product in product.
[5] EA stripped at 120 mm. Hg and 130° C. No rectification.
[6] Same, but with rectification.

In Table III there are listed the results of analyzing both the material leaving the fixation reactor before stripping and the still bottoms product obtained after stripping.

TABLE III

|  | Fixation product before stripping (Cycle 9) | Still bottoms product after stripping (Cycle 9) |
|---|---|---|
| Percent H₂SO₄ (as free acid) | 10.0 | 18.5 |
| Diethyl sulfate | 0.7 | 0.0 |
| Mono-ester sulfates | 12.3 | 16.1 |
| Other di-ester sulfates | 24.3 | 20.0 |
| Acrylic acid | 6.5 | 12.4 |
| Acrylic acid dimer | 24.6 | 30.1 |
| Ethyl acrylate | 13.6 | 2.7 |
| Acrylic acid-ethyl acrylate dimer | 7.4 | 1.7 |
| Ethoxy ethyl propionate | 0.7 | 0.0 |

As will be seen in Table II, the acrylic acid efficiency in cycle 1 is only 82.9% whereas this value climbs rapidly in the second cycle and averages (cumulatively) about 96% over the ten cycles shown. While the ethylene efficiencies appear quite variable the average or cumulative value is over 80%. These experiments show quite high productivities averaging over about 9 pounds of ethyl acrylate per cubic foot of reactor volume per hour. Expressed another way, about six pounds of ethyl acrylate product was obtained per pound of H₂SO₄ charged. In cycles 8, 9 and 10 when the stripping/disproportionation tower is operated under reflux with return of a portion of the crude ethyl acrylate to the top of the tower, the purity of the ethyl acrylate product is very high, since it averages over 96% purity.

Also, Table III shows the analysis of the crude fixation mixtures and of the still bottoms. These data confirm that in cycle 9 stripping was inefficient and indicates why the extra-ordinarily high acrylic acid efficiency of 142.7% was obtained in cycle 10. Nevertheless, the analysis shows that stripping reduces the ethyl acrylate content, the acrylic acid/ethyl acrylate dimer content, and the diethyl sulfate contents of the mixture. Meanwhile the sulfuric acid is effectively regenerated or concentrated (by the removal of ethyl acrylate and volatiles) from 10.0% wt. to 18.5%/wt. The total concentration of sulfate in the first four items has fallen very little over the 10 cycles indicating very low sulfate losses.

I claim:

1. In a process for the manufacture of a simple alkyl ester of an alpha-beta unsaturated monocarboxylic acid by interacting an olefin with said acid in the presence of sulfuric acid, the improvement which comprises effecting interaction under superatmospheric pressure, under substantially anhydrous conditions, and at a temperature of from about 100° C. to no higher than 170° C. between a 2 and 5 carbon atom alpha-monoolefin and an anhydrous sulfate solution containing from about 20% to about 80%/wt. of total sulfate including from about 5% to about 60%/wt. of free sulfuric acid and the free and combined forms of an alpha-beta unsaturated monocarboxylic acid containing up to 4 carbon atoms, said forms of said monocarboxylic acid totaling up to about 80%/wt. of said sulfate solution, subjecting the resulting reaction mixture to distillation under a vacuum below about 200 mm. Hg, at a still pot temperature not higher than about 170° C. and a still head temperature not higher than about 100° C. to effect disproportionation and release of vapors of said simple alkyl ester, and recovering said vapors.

2. In a process for the manufacture of a simple alkyl ester of an alpha-beta unsaturated monocarboxylic acid in which ester the acid moiety contains up to four carbon atoms and the alcohol moiety contains from 2 to 5 carbon atoms, the improvement which comprises the steps of (1) reacting under a pressure of from about 500 to about 1500 lbs./sq. in. and at a temperature of from about 125° to about 160° C. a substantially anhydrous 2 to 5 carbon atom alpha-monoolefin with a substantially anhydrous sulfuric acid medium containing from about 20% to about 80%/wt. of total sulfate content including from about 5% to about 60%/wt. of free sulfuric acid and up to about 80%/wt. of said monocarboxylic acid, (2) adding said monocarboxylic acid in anhydrous form to the resulting olefin-enriched fixation mixture at a rate of from about 0.75 to about 1 mole per mole of ester distilled in step (3), (3) distilling the step (2) mixture under a vacuum below about 200 mm. Hg with a still pot temperature in the range of from about 120° to about 160° C. and a still head temperature not higher than about 60° C. to effect a disproportionation releasing said simple alkyl ester as vapor overhead and leaving a sulfate solution as a still bottoms products, and (4) condensing and recovering said simple alkyl ester as a product.

3. The improved process as defined in claim 2 and further characterized by (a) the process being carried out in a continuous fashion in a closed system, (b) wherein the step (3) still bottoms product is recycled to step (1), and (c) wherein a portion of the step (4) condensate is returned to step (3) as reflux.

4. The improved process as defined in claim 2 and further characterized by said alpha-monoolefin being ethylene, said alpha-beta unsaturated monocarboxylic acid being acrylic acid, and said alkyl ester product being ethyl acrylate.

5. The improved process as defined in claim 2 and further characterized by being a continuous process wherein the said alpha-monoolefin is ethylene and there being chemically combined in the effluent from step (1) from about 0.75 to about 1.5 moles of ethylene per mole of total sulfate in said sulfuric acid medium thereby to maintain fluidity therein, by the said alpha-beta unsaturated monocarboxylic acid being glacial acrylic acid, by the said alkyl ester product released in step (3) being ethyl acrylate, by the said still bottoms product of step (3) being recycled to step (1) as recycle sulfate solution, and by adding said acrylic acid in step (2) at a rate about equimolar with the rate of release of ethyl acrylate in step (3) thereby to prevent continued build-up of the acrylic acid moieties recycled to step (1) in said recycle sulfate solution.

6. The improved process as defined in claim 2 and further characterized by the said process being carried out in a continuous fashion and by the added step of adding as required concentrated sulfuric acid to said step (3) still bottoms product to replace sulfur dioxide lost during the distillation of said step (3).

7. In a process for the manufacture of ethyl acrylate by interacting ethylene with acrylic acid in the presence of sulfuric acid, the improvement which comprises the steps of (1) reacting ethylene at a pressure of from about 100 to about 1500 lbs./sq. in. at a temperature of from about 125° to no higher than about 160° C., and under substantially anhydrous conditions with a mixture of sulfuric acid and acrylic acid containing between about 30% and about 60%/wt. of total sulfate content including from about 5% to about 60%/wt. of free sulfuric acid and between about 45% and about 65%/wt., of acrylic acid in free and combined form, (2) subjecting the resulting ethylene-enriched effluent of step (1) to vacuum distillation under a vacuum below 200 mm. Hg at a still pot temperature of from 120° C. to no higher than 160° C. and at a still head temperature not higher than about 100° C. taking ethyl acrylate overhead as vapor and leaving as a still bottom product a sulfate solution, (3) adding essentially anhydrous acrylic acid and, if required, concentrated sulfuric acid to said still bottoms product of step (2) to replace the sulfate and acrylic acid moieties removed during the distillation of step (2) and returning the resulting replenished sulfate solution as recycle to step (1).

8. In a process for the manufacture of ethyl acrylate from ethylene and acrylic acid in the presence of sulfuric acid, the improvement which comprises carrying out in a continuous fashion the successive steps of (1) interacting essentially anhydrous ethylene under a pressure of from about 500 to about 1000 lbs./sq. in. at a temperature of from about 125° to about 160° C. with a complex substantially anhydrous sulfate solution containing from about 30% to about 60%/wt. of total sulfate content including from about 5% to about 60%/wt. of free sulfuric acid and from about 45% to about 65%/wt. of free and combined acrylic acid and consisting of (a) a recycle sulfate solution remaining as a still bottoms product in step (3) below and (b) make-up concentrated sulfuric acid as needed to replace the small proportion of sulfur dioxide lost overhead in the distillation of step (3) below, there being thus reacted in step (1) to produce an effluent containing from about 0.75 to about 1.5 moles of total ethylene per mole of said total sulfate content in said complex sulfate solution, (2) adding amounts of acrylic acid of at least 96%/wt. purity to the ethylene-enriched effluent of step (1) approximately equimolar with the amount of ethyl acrylate removed from the process in step (5) below, (3) subjecting the step (2) mixture to distillation under a vacuum below about 200 mm. Hg with a still pot temperature from about 120° to about 160° C. and at a still head temperature not higher than about 60° C. to effect disproportionation of said step (2) mixture taking overhead as vapor ethyl acrylate and leaving as a still bottoms product a sulfate solution appreciably depleted in ethyl acrylate moieties, (4) returning said step (3) still bottoms product to step (1) as a recycle sulfate solution, and (5) recovering and removing from the process said ethyl acrylate vapors, all of steps (1) through (4) being carried out in a closed system excluding moisture.

References Cited

UNITED STATES PATENTS 2,548,518    4/1951    Coover, Jr., et al. ____ 260—482

FOREIGN PATENTS 1,332,186    6/1963    France ____________ 260—486

LORRAINE A. WEINBERGER, Primary Examiner

P. J. KILLOS, Assistant Examiner

U.S. Cl. X.R.

260—460, 484 A

UNITED STATES PATENT OFFICE
CERTIFICATE OF CORRECTION

Patent No. 3703539     Dated November 21, 1972

Inventor(s) BART A. DI LIDDO

It is certified that error appears in the above-identified patent and that said Letters Patent are hereby corrected as shown below:

Col. 2, line 39 that portion of the formula should read

Col. 7, line 52 "20" second occurrence, should read --30--.

In Table I, under the "Cumulative" column the figure "439" should be in the "Total" line at the end.

In Table II, in cols. 3 and 4 "2-10" and "2-30" should read --2-30-- and --4-28-- respectively.

Signed and sealed this 20th day of November 1973.

(SEAL)
Attest:

EDWARD M. FLETCHER, JR.
Attesting Officer

RENE D. TEGTMEYER
Acting Commissioner of Patents